United States Patent [19]
Nicoloff, Jr. et al.

[11] Patent Number: 5,903,290
[45] Date of Patent: *May 11, 1999

[54] SIMULTANEOUSLY PRINTING WITH DIFFERENT SECTIONS OF PRINTHEADS FOR IMPROVED PRINT QUALITY

[75] Inventors: Nicholas Nicoloff, Jr., La Mesa, Calif.; Mark S. Hickman, Vancouver, Wash.

[73] Assignee: Hewlett-Packard Co., Palo Alto, Calif.

[ * ] Notice: This patent is subject to a terminal disclaimer.

[21] Appl. No.: 08/902,163

[22] Filed: Jul. 29, 1997

Related U.S. Application Data

[63] Continuation of application No. 08/399,401, Mar. 6, 1995, Pat. No. 5,654,744.

[51] Int. Cl.⁶ .............................. B41J 2/21; B41J 2/145; B41J 2/15
[52] U.S. Cl. ............................................... 347/43; 347/40
[58] Field of Search .................... 347/43, 12, 9, 347/40

[56] References Cited

U.S. PATENT DOCUMENTS

| | | | |
|---|---|---|---|
| 4,812,859 | 3/1989 | Chan et al. | 347/43 |
| 4,833,491 | 5/1989 | Rezanka | 347/43 |
| 4,965,593 | 10/1990 | Hickman | 347/12 |
| 4,967,203 | 10/1990 | Doan et al. | 347/41 |
| 4,999,646 | 3/1991 | Trask | 347/41 |
| 5,278,584 | 1/1994 | Keefe et al. | 347/63 |
| 5,376,958 | 12/1994 | Richtsmeier et al. | 347/43 |
| 5,455,610 | 10/1995 | Harrington et al. | 347/43 |
| 5,654,744 | 8/1997 | Nicoloff, Jr. et al. | 347/43 |

FOREIGN PATENT DOCUMENTS

| | | | |
|---|---|---|---|
| 0348181A2 | 12/1989 | European Pat. Off. | B41J 3/04 |
| 0546853A1 | 6/1993 | European Pat. Off. | H04N 1/18 |
| 0433556 | 6/1991 | Germany . | |

*Primary Examiner*—N. Le
*Assistant Examiner*—Thinh Nguyen
*Attorney, Agent, or Firm*—Jerry R. Potts

[57] ABSTRACT

In one embodiment of the invention, a scanning carriage in a color inkjet printer houses three identical color pens for printing cyan, magenta, and yellow. A separate array of nozzles is associated with each color ink. The nozzle arrays are such that they scan over the same print area of the medium during a single scan. To prevent the wet ink from one color swath being deposited over or bleeding into the wet ink from another color swath during the same scan, only a section of each nozzle array is used for printing during a single scan such that wet ink of two different colors cannot overlap during a single scan. This technique reduces ink bleed between colors as well as paper cockle. In another embodiment, a single tricolor pen is used where a single nozzle plate contains three nozzle arrays, one for each color. A section of each nozzle array is used during a single scan, as described above, to prevent wet ink of two different colors from overlapping during a single scan.

25 Claims, 13 Drawing Sheets

SIMULTANEOUSLY PRINTING WITH DIFFERENT SECTIONS OF PRINTHEADS FOR IMPROVED PRINT QUALITY

This application is a continuation in part of U.S. Ser. No. 08/399,401, filed Mar. 6, 1995, U.S. Pat. No. 5,654,744.

BACKGROUND OF THE INVENTION

This invention relates generally to printers and, more specifically, to printing techniques for color printers.

Thermal inkjet printers operate by selectively energizing heating elements to expel droplets of ink through associated nozzles. Each heating element, which is typically a pad of resistive material about 50 μm by 50 μm in size, is located in a chamber filled with ink supplied from an ink reservoir. A nozzle plate, defining an array of nozzles, overlies the various chambers. Upon energizing a particular heating element, a portion of the ink in the chamber is vaporized and a droplet of ink is expelled through an associated nozzle toward the print medium, whether paper, fabric, or the like. The firing of the heating elements is typically under the control of a microprocessor, the signals of which are conveyed by electrical traces to the heating elements. The arrangement of printed dots may form any pattern, such as text or graphics.

One embodiment of an inkjet pen is described in Hewlett-Packard's U.S. Pat. No. 5,278,584, by Brian J. Keefe, et al., entitled INK DELIVERY SYSTEM FOR AN INKJET PRINTHEAD, incorporated herein by reference.

Some of Hewlett-Packard's color printers will include a scanning carriage housing one inkjet pen containing black ink, as well as housing one or more color inkjet pens for printing cyan, magenta, or yellow ink. These color inkjet pens typically have a resolution of 300 dots per inch (dpi) in both the x and y axes and a printhead width (along the direction of paper travel) on the order of one-third inch.

During printing, the pens are scanned across the width of the medium to be printed upon while the medium remains stationary. During each scan, the cyan, magenta, and yellow inks are ejected by the nozzles under control of the microprocessor to create the desired colors and patterns. Each completed scan across the medium can print a swath approximately as wide as the width of the entire nozzle array of a pen. After each scan, during which all colors and the black ink may be printed, the medium is moved forward the width of a swath, and the pens begin printing the next swath.

The color pens may be either a single tricolor pen, having three sets of nozzles for cyan ink, magenta ink, and yellow ink, respectively, or consist of three separate and identical pens each containing a respective one of the cyan, magenta, or yellow inks. Secondary colors are obtained by overlapping the various colors of ink or printing different color dots adjacent one another.

Various problems arise when printing using the above technique. Because of the wet ink being drawn into the surrounding dry media by capillary action, the edges of the printed images tend to become less defined. Also, when inks of differing colors are printed adjacent to each other, the different color inks tend to bleed into each other. Another problem encountered in inkjet printing is paper cockle. The ink used in inkjet printing is typically of a liquid base. When the liquid ink is deposited on wood-based papers, it absorbs into the cellulose fibers and causes the fibers to swell. As the cellulose fibers swell, they generate localized expansion, which, in turn, causes the paper to warp (cockle) in these regions. This can cause a degradation of print quality due to uncontrolled pen-to-paper spacing, and can also cause the printed output to have a low quality appearance due to the wrinkled paper.

What is desirable is a method for controlling the color pen(s) in a scanning carriage to mitigate the above-mentioned problems of ink bleed and cockle.

BRIEF SUMMARY OF THE INVENTION

In one embodiment of the invention, a scanning carriage in a color inkjet printer houses three identical color pens for printing cyan, magenta, and yellow. A separate array of nozzles is associated with each color ink. The carriage may also house a black pen. The nozzle arrays are such that they scan over the same print area of the medium during a single scan. To prevent the wet ink from one color swath being deposited over or bleeding into the wet ink from another color swath during the same scan, only a section of each nozzle array is used for printing during a single scan such that wet ink of two different colors cannot overlap during a single scan. This gives the color ink deposited in one scan time to dry and penetrate the medium before a second color is deposited over that previously deposited color. This technique reduces ink bleed between colors as well as paper cockle.

In another embodiment, a single tricolor pen is used where a single nozzle plate contains three nozzle arrays, one for each color. A section of each nozzle array is used during a single scan, as described above, to prevent wet ink of two different colors from overlapping during a single scan.

This is an improvement over a staggered pen approach, since existing carriage and pen alignment techniques may be used. Also, a staggered pen approach would increase the size of the carriage.

DETAILED DESCRIPTION OF THE PREFERRED EMBODIMENTS

Figure 1:
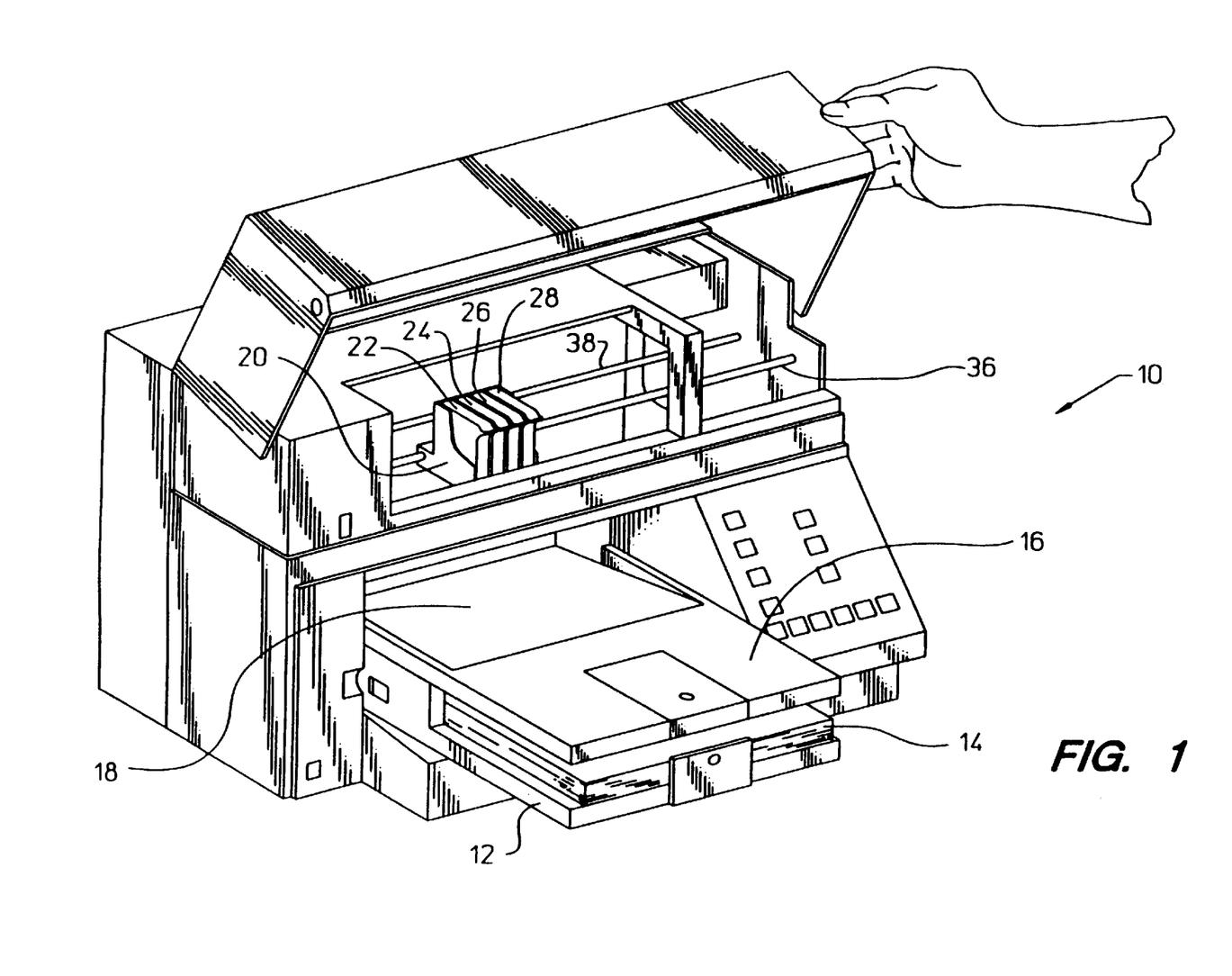
FIG. 1 shows a typical inkjet printer which can incorporate the apparatus and method of the present invention.
Figure 2:
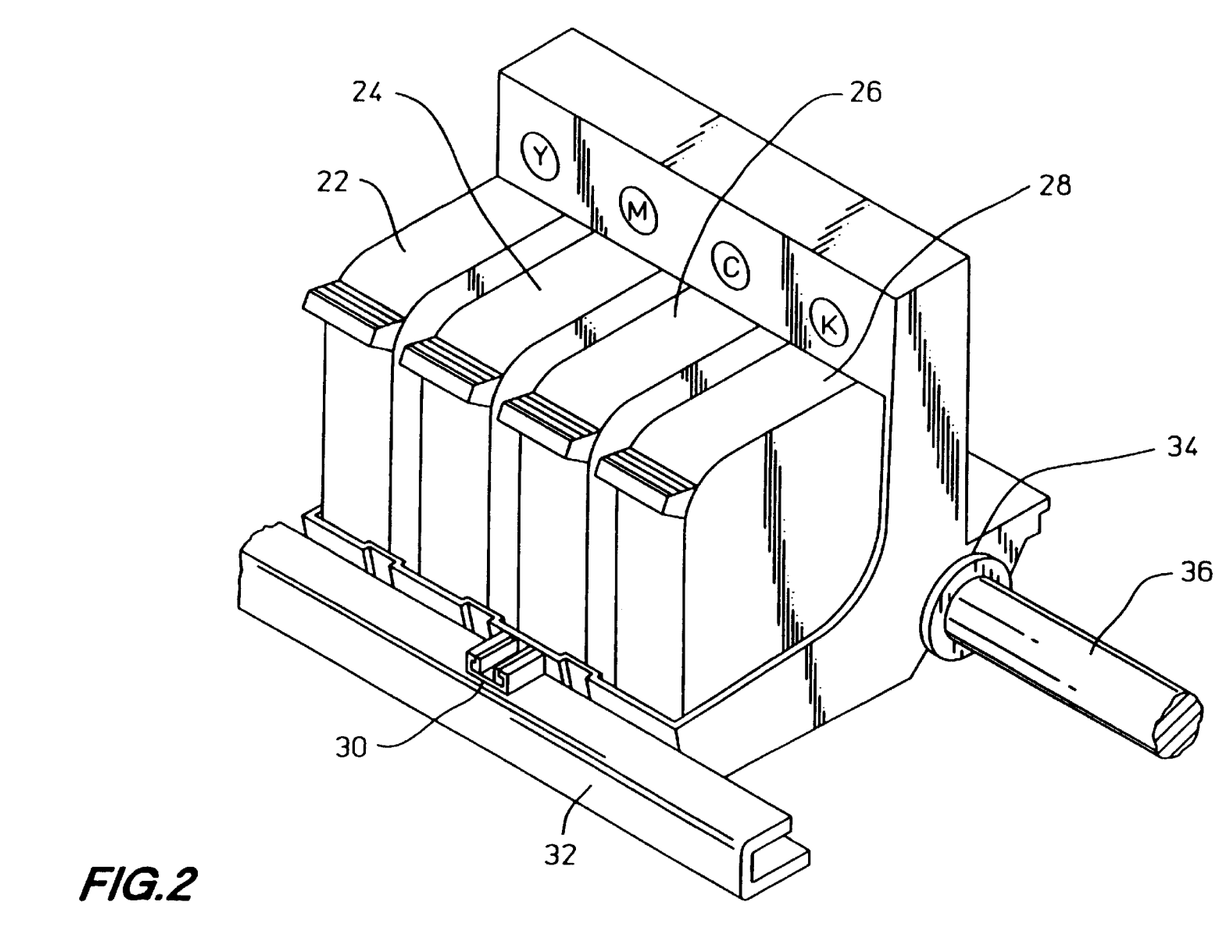
FIG. 2 shows a carriage having removable multi-color print cartridges, which can incorporate the apparatus and method of the present invention.
Figure 3:
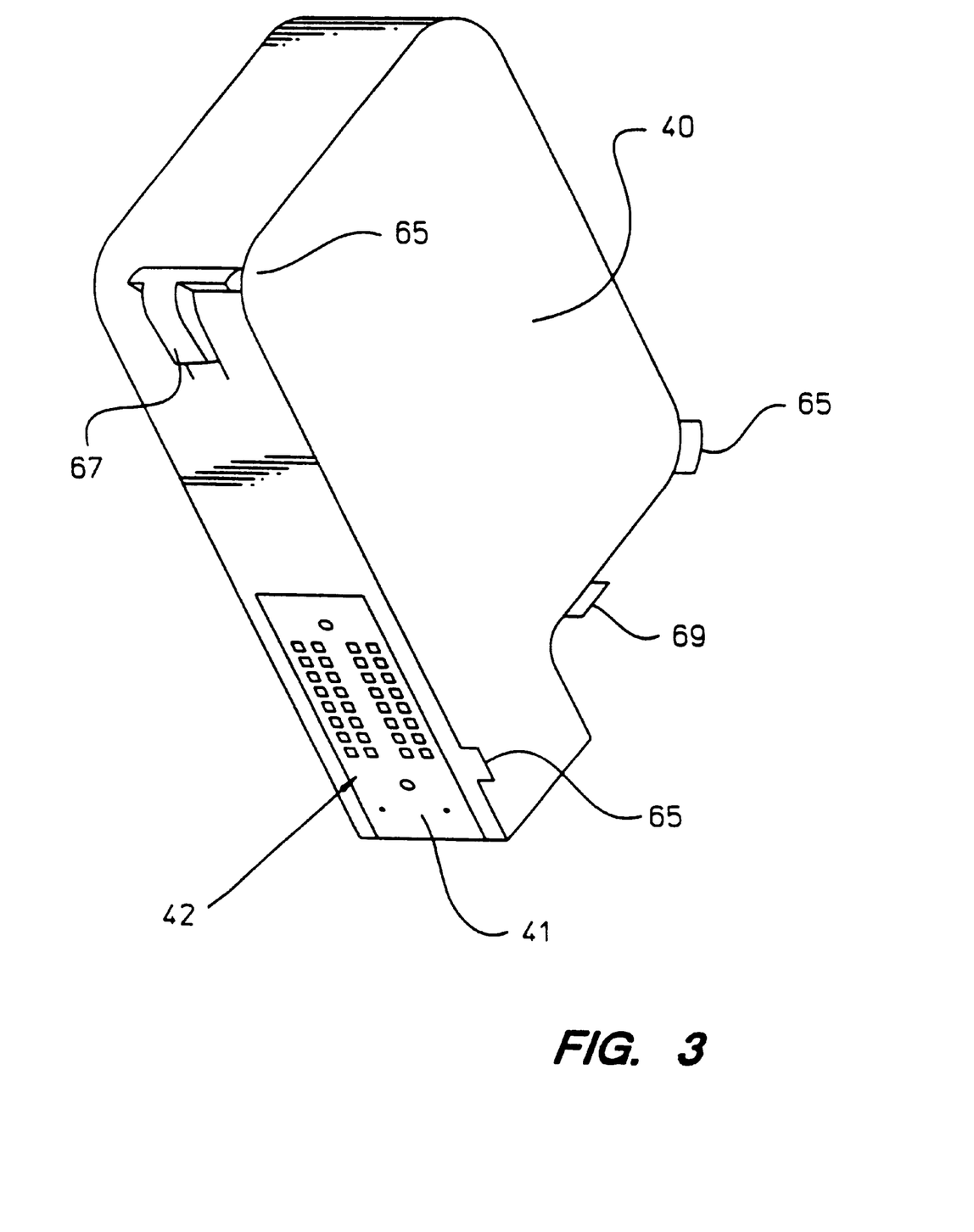
FIG. 3 shows an exemplary lower resolution color inkjet print cartridge used in one embodiment of the invention.

Even though the invention can be used in any type of color printer, an embodiment of the invention will be explained in the context of an inkjet printer of the type shown in FIG. 1. In particular, inkjet printer 10 includes an input tray 12 containing sheets of media 14 which pass through a print zone, and are fed past an exit 18 into an output tray 16. Referring to FIGS. 1–2, a movable carriage 20 holds print cartridges 22, 24, 26, and 28 which respectively hold yellow (Y), magenta (M), cyan (C) and black (K) inks. The front of the carriage has a support bumper 30 which rides along a guide 32 while the back of the carriage has multiple bushings such as 34 which ride along slide rod 36. The position of the carriage as it traverses back and forth across the media is determined from an encoder strip 38 in order to be sure that the various ink nozzles on each print cartridge are selectively fired at the appropriate time during a carriage scan.

Figure 13A:
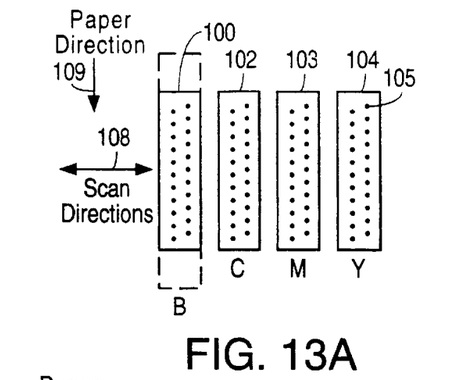
FIGS. 13A and 13B are schematic views as seen looking up from the media showing two different arrangements of black and color pens housed in a scanning carriage.
Figure 13B:
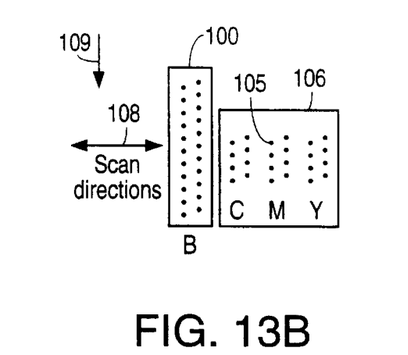

In another embodiment printer, the color print cartridges 22, 24, and 26 are replaced by a single tricolor cartridge having a nozzle plate such as shown in FIG. 13B.

Figure 4:
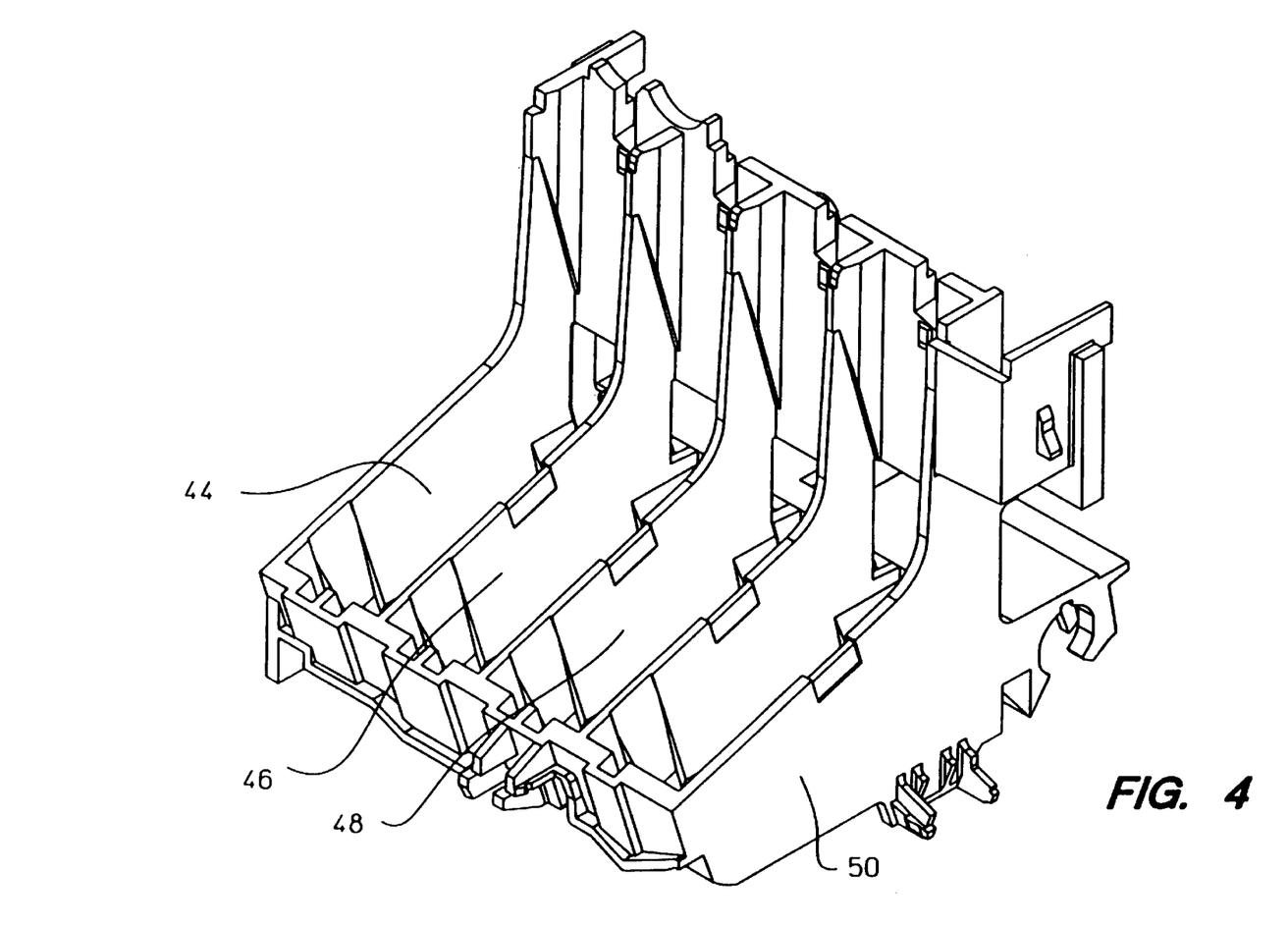
FIG. 4 is a perspective view of a carriage incorporating one embodiment of the invention in an inkjet printer.
Figure 5:
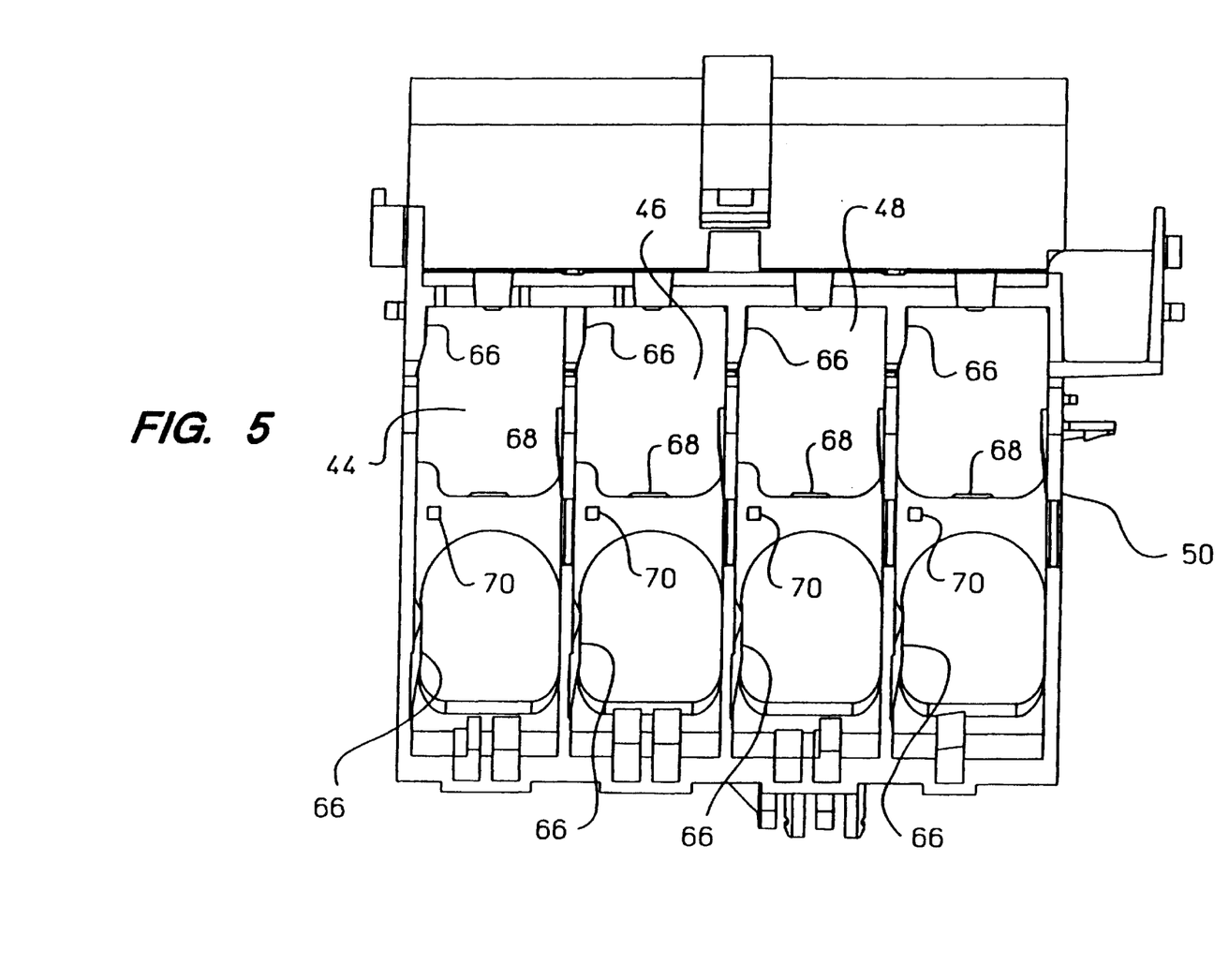
FIG. 5 is a top view of the carriage of FIG. 4.
Figure 6:
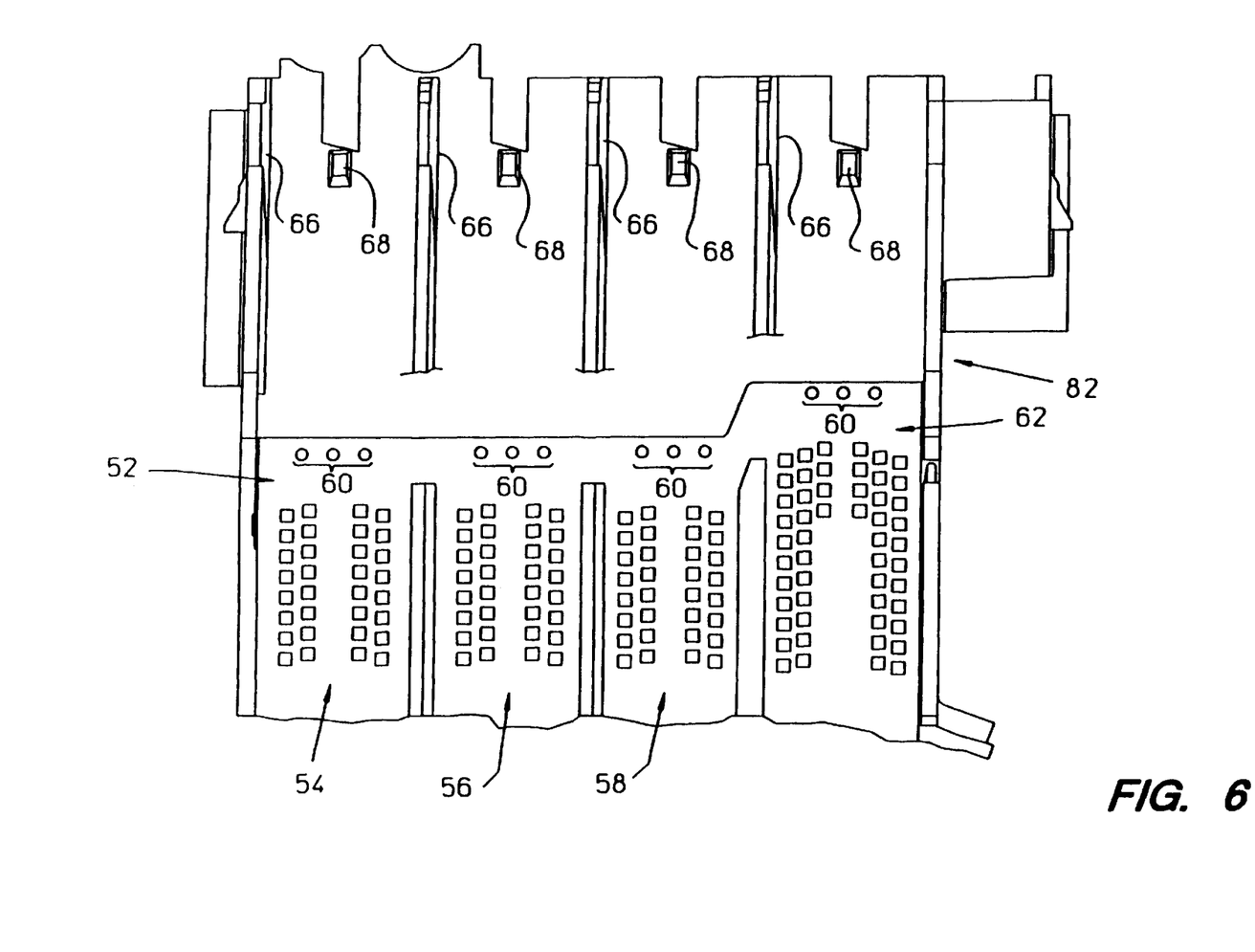
FIG. 6 is a fragmentary view of the flex-circuit interconnect on the carriage of FIGS. 4 and 5, with the interior carriage walls cut away.

Referring to FIGS. 3–6, a 300 dpi color inkjet cartridge 40 having a tab-circuit 41 with a four column thirty-two pad electrical interconnect 42 is removably installed in any one of three chutes 44, 46, 48 of a unitary carriage 50 (FIG. 4). A flex-circuit member 52 (FIG. 6) having three matching sets of conductive pads 54, 56, 58 is mounted on flex-frame pins 60 for operative engagement with the cartridge pads, such as page 42, when the cartridge 40 is inserted into its appropriate chute. An enlarged set of conductive pads 62 covering a larger area, having a different layout, and constituting an array of six columns totaling fifty-two conductive pads on the flex-circuit member 52 is designed for operative engagement with cartridge pads on a 600 dpi black inkjet cartridge 64 (see FIG. 9).

The preferred structure and techniques for preventing mistaken installation of a 600 dpi black printhead in a color printhead chute, or alternatively the mistaken installation of a 300 dpi color printhead in a black printhead chute is described in the copending applications identified above and incorporated by reference herein.

Because of the differently configured electrical interconnect on the 600 dpi cartridge, and in order to avoid substantially changing the existing X/Y/Z datum configuration of the carriage, a unique interconnect scheme is employed. In that regard, the X-axis cartridge datums 65 engage the X-axis carriage datums 66, and the Y-axis cartridge datums 67 engage the Y-axis carriage datums 68, and the Z-axis cartridge datums 69 engage the Z-axis carriage datums (not shown) in a manner more fully described in the copending applications identified above and incorporated by reference herein.

Figure 9:
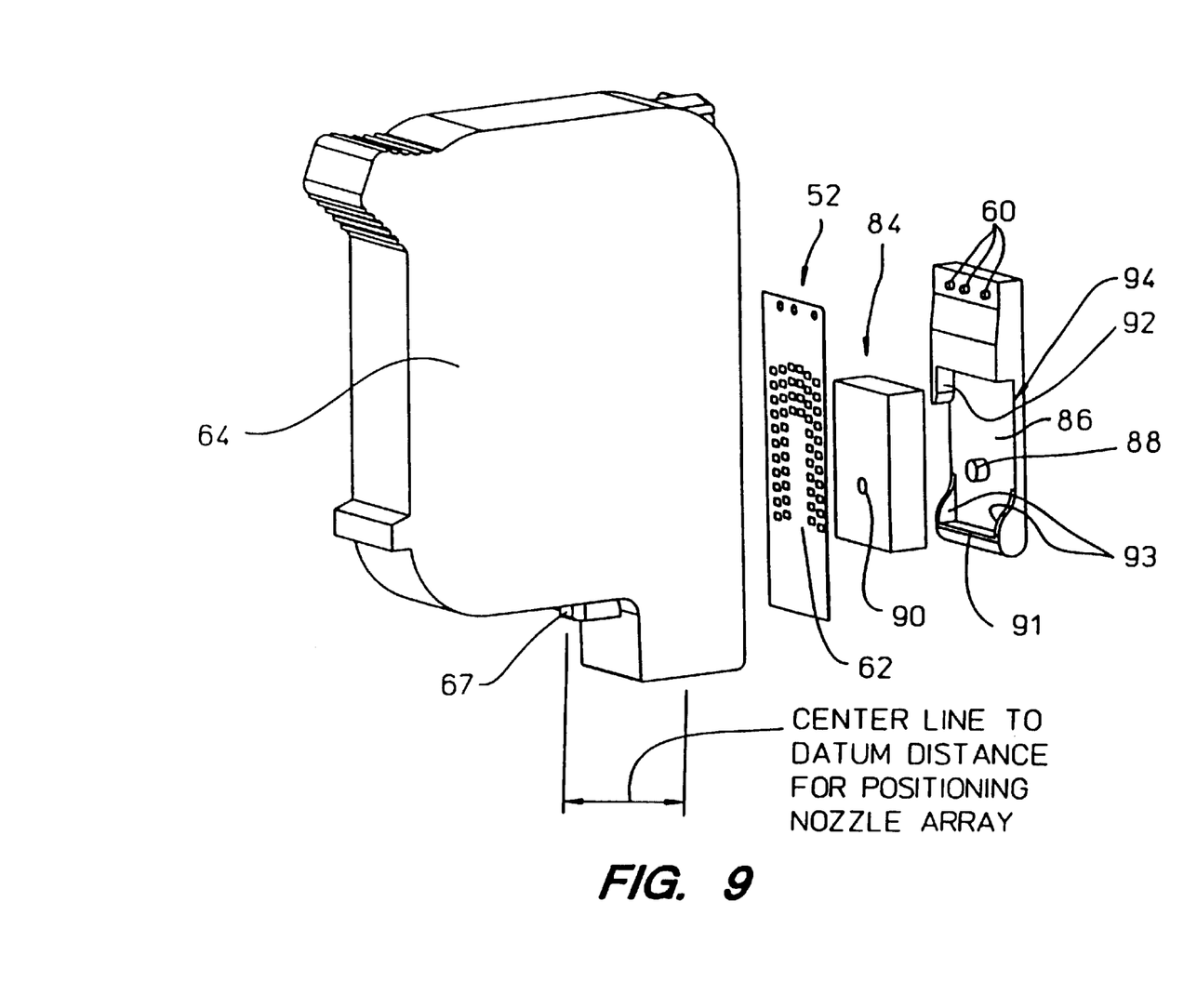
FIG. 9 is a schematic view showing the use of a foam member for operatively connecting a flex-circuit to a higher resolution black inkjet cartridge.
Figure 10:
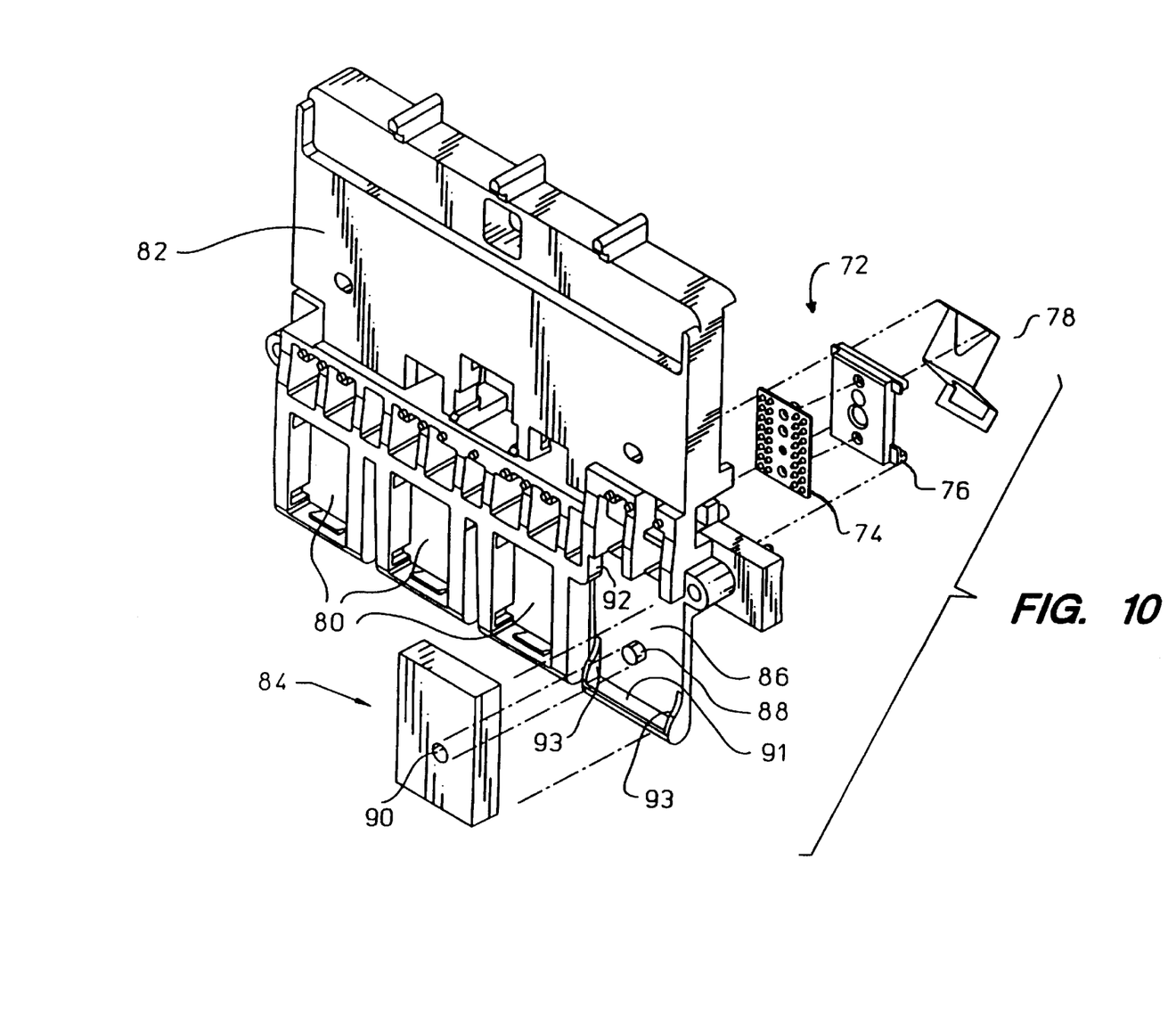
FIG. 10 is an exploded view showing a flex-circuit frame portion of a carriage, with the foam spring member of FIG. 9 for assuring pressure connection of a flex-circuit to a higher resolution black inkjet cartridge, and a metal spring member for assuring pressure connection of a flex-circuit to lower resolution color inkjet cartridges.
Figure 11:
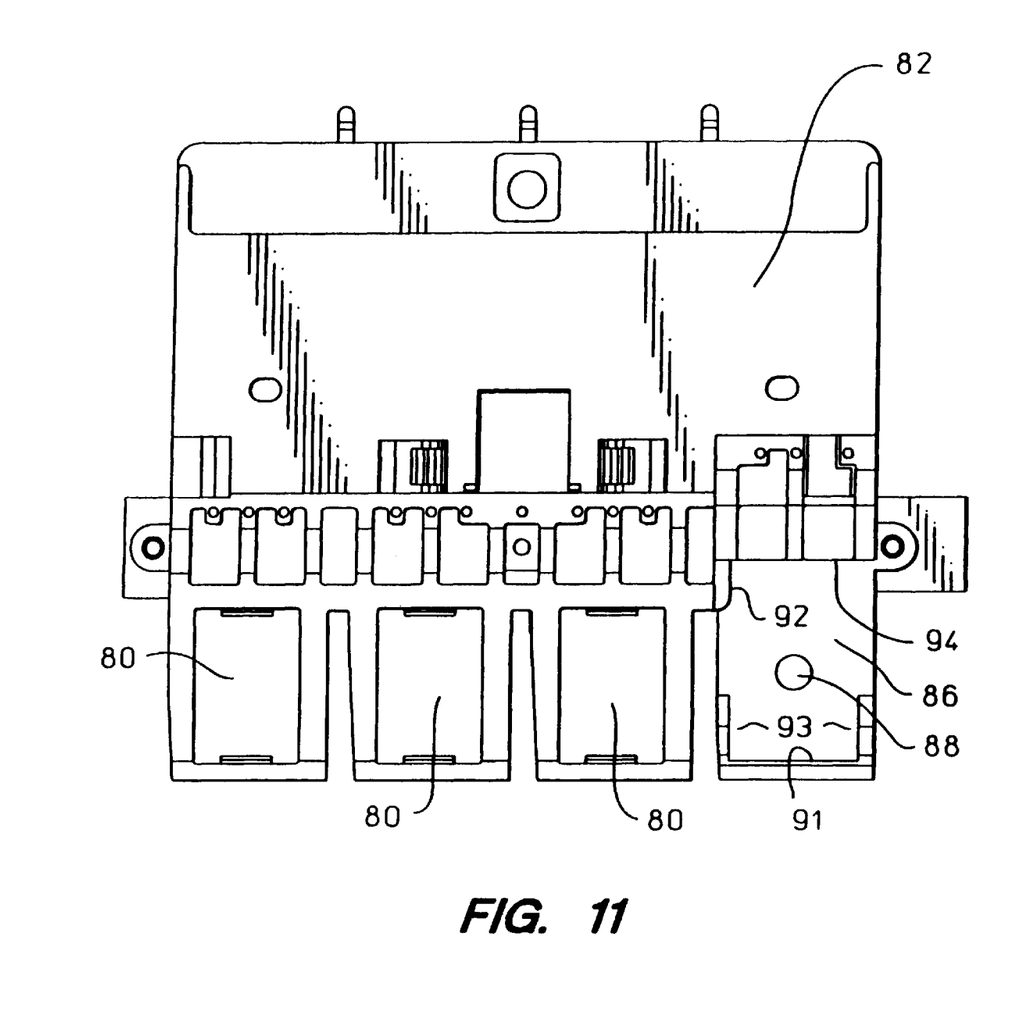
FIG. 11 is a front view of the flex-circuit frame of FIG. 10.

As best shown in FIGS. 9–11, a spring assembly 72 including a backing sheet 74, a plate 76 and a gimbal spring 78 are sized for fitting into apertures 80 of flex-circuit frame 82 to assure proper electrical interconnection for the three color cartridges.

A unique spring assembly for the 600 dpi cartridge interconnect includes a unitary resilient foam member 84 which fits in a seat 86 which is larger than the aperture 80. A mounting peg 88 fits into matching hole 90 which along with bottom and lower ledges 91, 93 and upper side and top ledges 92, 94 hold the foam member in proper position to assure operative engagement across the electrical interconnect.

Figure 7:
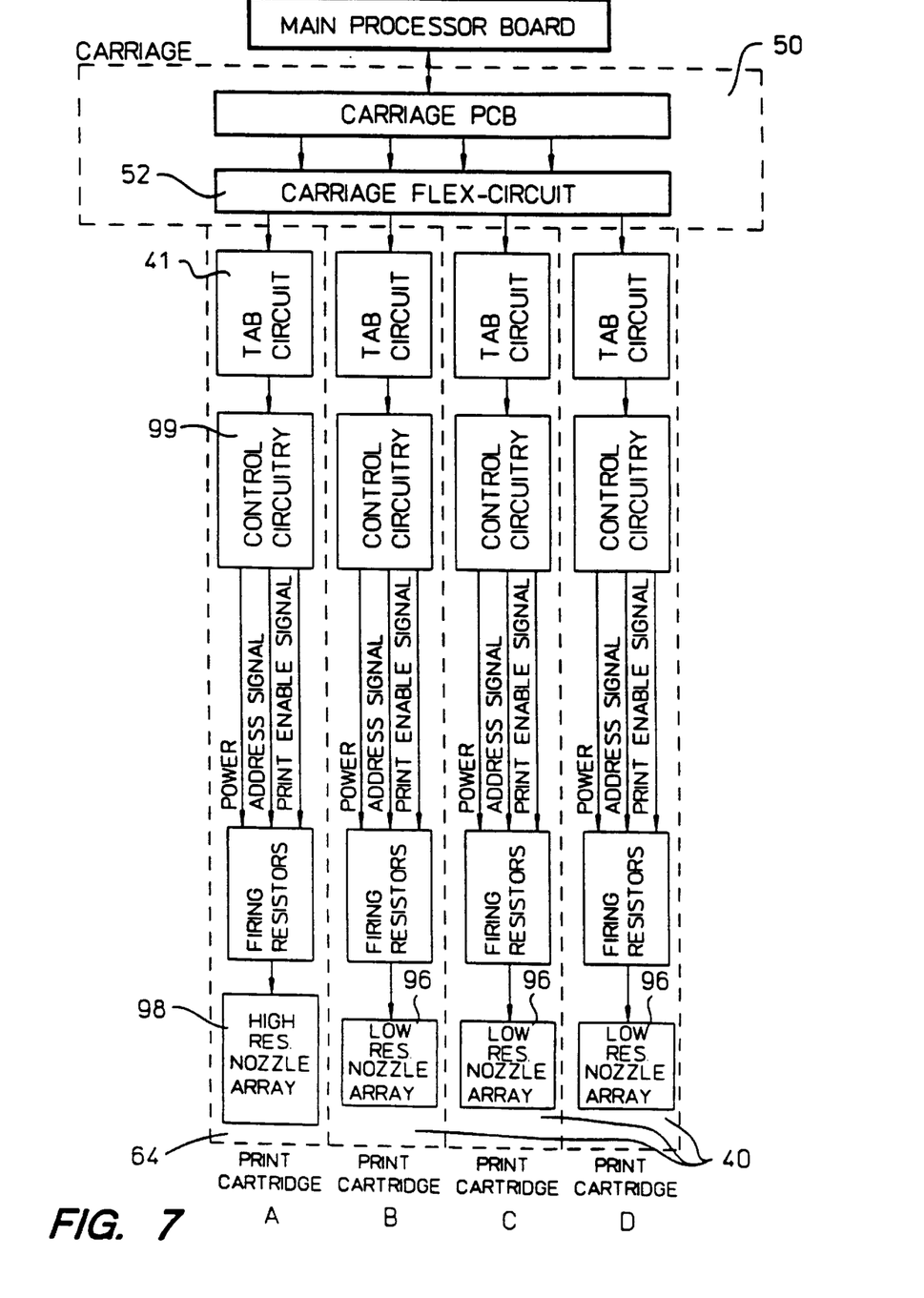
FIG. 7 is a schematic block diagram of the print cartridges in one embodiment of the invention.
Figure 8:
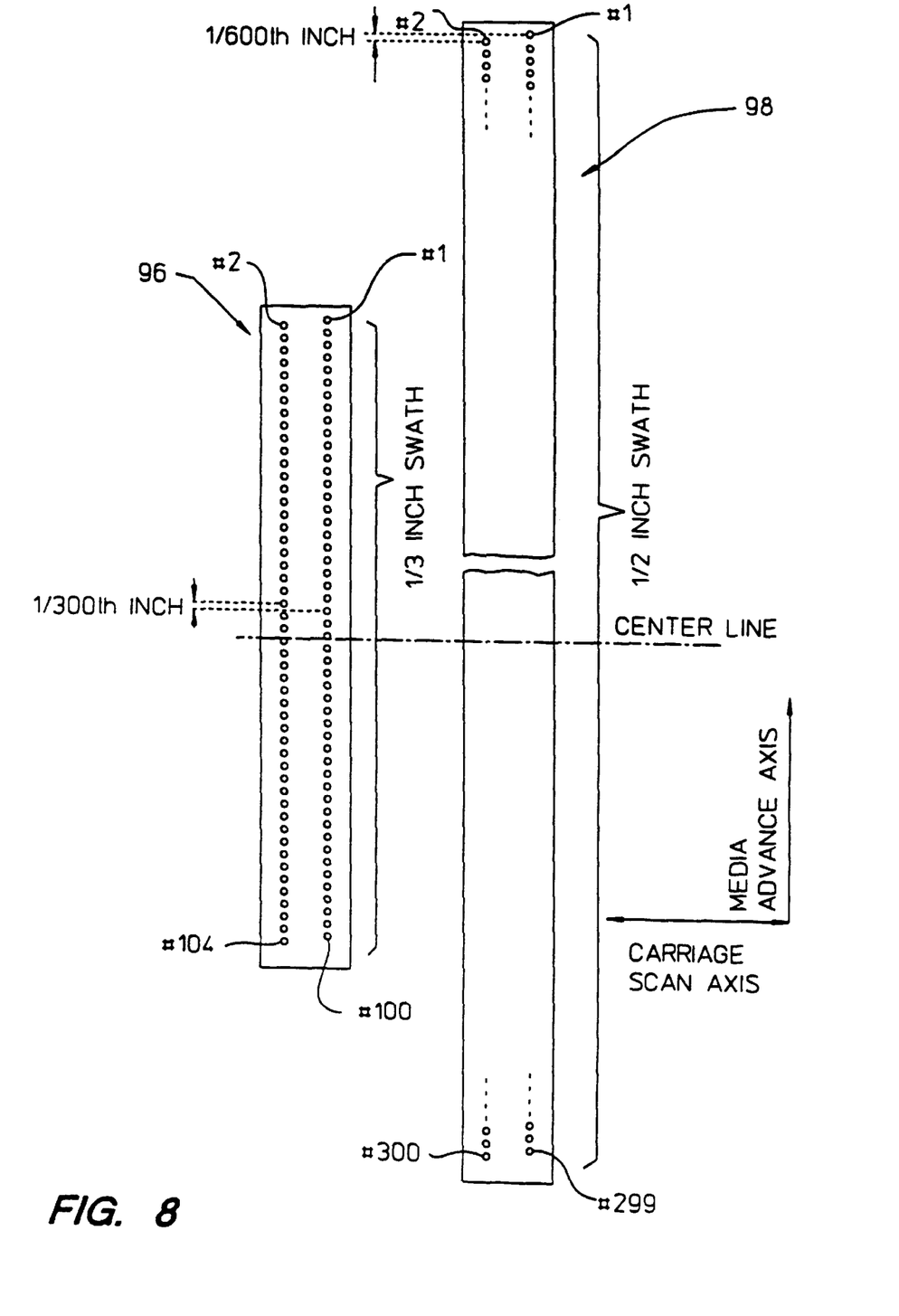
FIG. 8 is a schematic bottom view as seen looking up from the media showing one alignment relationship of the nozzle arrays of FIG. 7.

FIGS. 7–8 show one possible mounting relationship between a 300 dpi nozzle array 96 of the color printheads and a 600 dpi nozzle array 98 of the black printhead. Control circuitry 99 (including a multiplexer) on the substrate enables the three hundred firing resistors of the black printhead to be controlled through fifty-two electrical interconnect pads, and similarly enables all one hundred four firing resistors of each color printhead to be controlled through thirty-two electrical interconnect pads.

Figure 12:
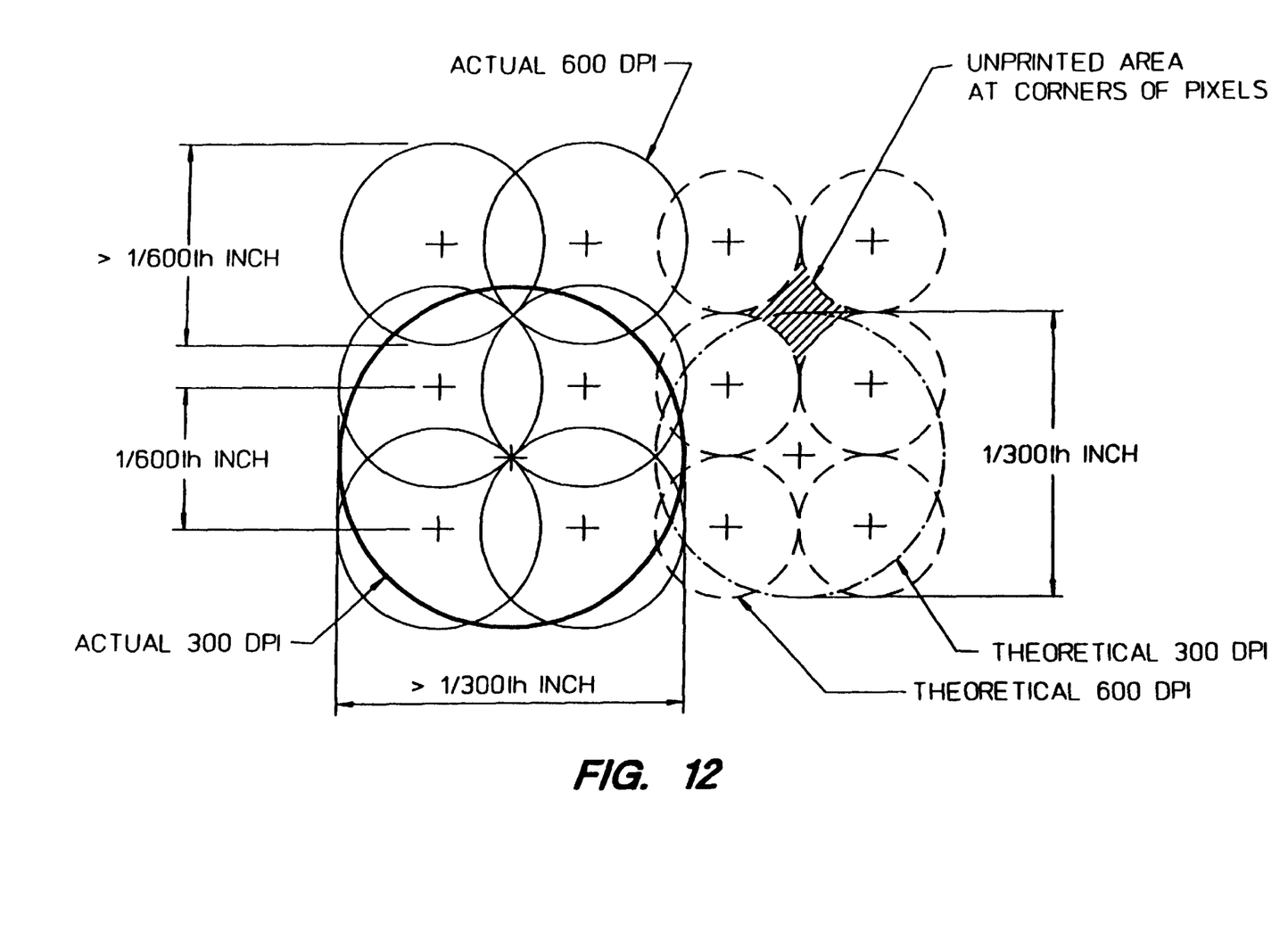
FIG. 12 is a schematic diagram showing the relative resolution between a 600 dpi printout of the black printhead and a 300 dpi printout of the color printheads in one embodiment of the invention.

FIG. 12 schematically shows the difference between the 300 dpi printout produced by the color pens (i.e., pen cartridges) and the 600 dpi printout of the black pen of the preferred embodiment described herein. The type of paper used, along with other well known factors, affect ink bleed. Therefore, the diameters of the actual printed dots in FIG. 12 will vary.

The inventive method described below applies equally to a printer using multiple color pens or a single tricolor pen.

FIG. 13A is a schematic view as seen looking up from the media at the nozzle plates of the black pen 100, cyan pen 102, magenta pen 103, and yellow pen 104. The arrangement of the pens in the carriage 20 of FIG. 1 is not significant in this invention. Although the widths of the nozzle arrays may all be identical, the width of the nozzle array of the black pen 100 may be wider, as illustrated by dashed outline, to obtain faster printing speeds for black printing. The individual nozzles 105 are shown in simplified form, and a pen may contain many more nozzles.

A functionally similar structure is shown in FIG. 13B, which shows the nozzle plate of a black pen 100 and that of a tricolor pen 106. Such a tricolor pen 106 contains three ink reservoirs each holding either cyan ink, magenta ink, or yellow ink, and each in fluid communication with an associated one of the three groups of nozzles 105. Such a tricolor pen 106 may be substituted for the three separate color pens in the scanning carriage illustrated in FIGS. 1 and 2. The scanning carriage of FIGS. 1 and 2 would be modified to support and align the tricolor pen 106 in a manner similar to that described with respect to the individual color pens.

In FIGS. 13A and 13B, the scanning direction of the pens across a page is shown by arrow 108, while the paper transport direction is identified by arrow 109.

In accordance with the present invention, instead of different colors of ink being simultaneously ejected along the entire width of the nozzle arrays of the various color pens 102–104 or the tricolor pen 106, only selected sections of each of the nozzle arrays may eject ink to avoid two colors of ink overlapping in a single scan of the carriage. The section of each nozzle array which may eject ink is changed for each scan of the carriage so that, after multiple scans, a complete swath of each color may be printed across the medium. By waiting until one color has dried (or substantially dried) before applying another color on top of it (during a different scan) or by preventing two different colors of wet ink from bleeding into each other, the print characteristics are better defined and there is less overall swelling of the paper, resulting in less curling.

To control which sections of the nozzle arrays eject ink, the control circuitry in the printer effectively blocks energization signals to the heating elements associated with the non-selected section of the nozzle arrays. During each scan, different groups of heating elements are effectively disabled. During these multiple scans, the medium is held stationary until an entire full-color swath is printed. The modifications to a conventional printer's hardware and any software (or firmware) required to carry out this invention would be understood by those skilled in the art after reading this disclosure.

Figure 14:
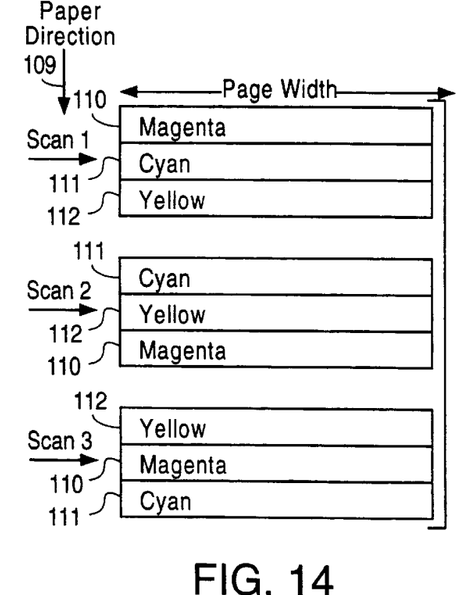
FIGS. 14, 15 and 16 illustrate the selective energization of sections of a printhead to prevent different colors of ink from overlapping during a single scan of a carriage across a medium.
Figure 15:
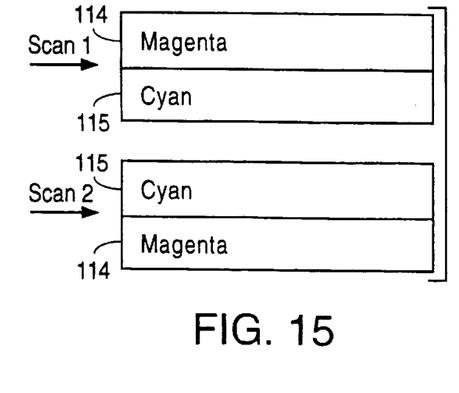
Figure 16:
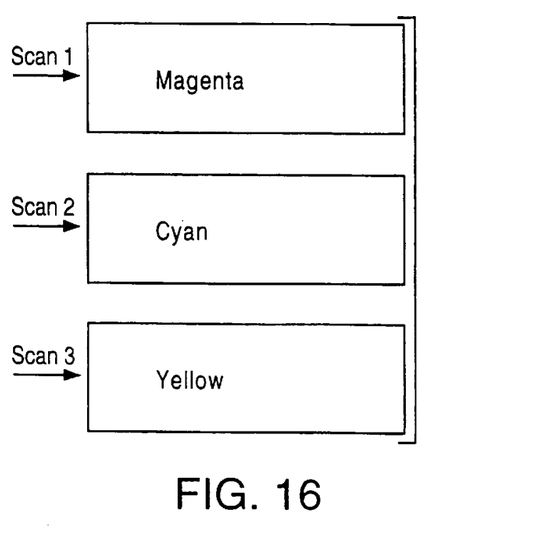

FIGS. 14, 15, and 16 illustrate three embodiments of this method.

In FIG. 14, the paper or other medium is held stationary while the carriage containing the pens makes three scans back and forth across the paper. Printing may occur during both scan directions or during only one scan direction. In the first scan, only the heating elements associated with the top one-third of the nozzles in the magenta pen 103 (FIG. 13A) are selectively energized to print a top swath 110 of magenta ink across the page. Assuming there are 100 nozzles in each of the nozzle arrays of pens 102, 103, and 104, only the top 33 nozzles of the magenta pen 103 may eject ink. Simultaneously, only the heating elements associated with the middle one-third of the nozzles in the cyan pen 102 are selectively energized to print a middle swath 111 of cyan ink during this first scan. Simultaneously, only the heating elements associated with the bottom third of the nozzles in the yellow pen 104 are selectively energized during this first scan so as to produce the bottom yellow swath 112.

In a second scan of the carriage across the same portion of the medium, the heating elements associated with the top third of the nozzles in the cyan pen 102 are selectively energized, the heating elements associated with the middle third of the nozzles in the yellow pen 104 are selectively energized, and the heating elements associated with the bottom third of the nozzles in the magenta pen 103 are selectively energized.

In the third scan across the same portion of the medium, the heating elements associated with the top third of the nozzles in the yellow pen 104 are selectively energized, the heating elements associated with the middle third of the nozzles in the magenta pen 103 are selectively energized, and the heating elements associated with the bottom third of the nozzles in the cyan pen 102 are selectively energized.

After the three scans shown in FIG. 14, full swaths of cyan, magenta, and yellow ink have now been printed on the medium. The swaths 110, 111, 112 may occur in any order. The medium is then advanced a full swath width and the printing process is repeated.

Since many colors to be printed do not require all three of the primary colors, using a fixed three-scan approach would be inefficient. If only two colors were required to print a full swath across a medium, then only two scans would be required, as illustrated in FIG. 15. FIG. 15 illustrates the situation where only magenta and cyan inks are required to print the desired colors across a full swath. In a first scan, the heating elements associated with the top half of the nozzles in the magenta pen 103 and the heating elements associated with the bottom half of the nozzles in the cyan pen 102 are selectively energized to print swaths 114 and 115. In a second scan across the same portion of the medium, the heating elements associated with the bottom half of the nozzles in the magenta pen 103 and the heating elements associated with the top half of the nozzles in the cyan pen 102 are selectively energized. In this particular example, the yellow ink is not used.

The selective operation of the heating elements in the tricolor pen 106 (FIG. 13B) printhead is identical to that described above, since the three arrays of nozzles in the tricolor pen 106 are functionally equivalent to the three arrays of nozzles in pens 102, 103 and 104. In one embodiment, the nozzle array for each color in the tricolor pen 106 contains 64 nozzles instead of the 100 nozzles in the individual pens 102–104. The resulting printed swath across a page for each scan will be identical to those shown in FIGS. 14 and 15.

FIG. 16 illustrates another embodiment of the invention where heating elements associated with the full nozzle array for a single color are selectively energized during a single scan of the carriage. In this case, a full swath of a single color is printed during each scan. After each scan, a full swath of another color is printed. After three scans, all three colors are printed. In the particular example of FIG. 16, only the magenta pen 103 is energized for the first scan, only the cyan pen 102 is energized for the second scan, and only the yellow pen 104 is energized for the third scan.

A separate scan may be performed for the black pen 100 or the black pen 100 may be energized simultaneously with any of the color pens.

The selection of a particular nozzle array section to be used for printing during a scan may be predetermined, or the selection may be made dynamically, where such selection would depend on the colors required to be printed in a full swath across a page.

In another embodiment of the invention, the sections of the color pen printheads may be energized in the manner illustrated for the first scan in FIG. 14. The medium may then be forwarded after this first scan by a distance equal to one-third of the total swath width. The same sections of the printheads are again energized to print the same color pattern but effectively shifted down one-third swath width on the medium. This would cause the cyan ink to be printed over magenta ink from the previous scan, cause the yellow ink to be printed over cyan ink from the previous scan, and cause magenta ink to be printed over a blank portion of the medium. After another shift of the medium, the yellow ink printed in a third scan overlaps the cyan ink printed in the second scan which overlaps the magenta ink printed in the first scan. As would be understood, the dots of the various primary colors do not need to physically overlap to produce the appearance of additional colors.

The various sections of the nozzle arrays ejecting ink during a scan may also be changed during a single scan to avoid possible visual artifacts, as long as two overlapping colors are not printed during a single scan.

To reduce any visible artifacts caused by ink bleed of two adjacent colors printed during a single scan (e.g., swaths 110 and 111 in FIG. 14, scan 1), adjacent swaths (such as swaths 110 and 111) may be printed to effectively dovetail one another to avoid any well-defined interface between the two colors. This technique is known as shingling. The extent of dovetailing between two adjacent colors without creating visual artifacts may be determined on a empirical basis.

The above-described methods may be performed by various types of printers, including thermal and non-thermal types.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a color printer, said color printer incorporating an inkjet tricolor pen, said tricolor pen containing at least three linear arrays of nozzles, each nozzle having an associated ink ejection element for facilitating the ejecting of ink, a first linear array of nozzles for ejecting a first color ink, a second linear array of nozzles for ejecting a second color ink, and a third linear array of nozzles for ejecting a third color ink, said tricolor pen being supported by a scanning carriage in said printer which scans in a horizontal direction, said linear arrays of nozzles running parallel to each other and each linear array running in a vertical direction such that said first linear array, said second linear array, and said third linear array scan across the same area of a medium to be printed upon during a single scan of said scanning carriage, and said method comprising:

selectively energizing ink ejection elements in said tricolor pen for ejecting ink through associated nozzles in said first linear array, said second linear array, and said third linear array during a single scan so that different color inks that are ejected from said first linear array, said second linear array, and said third linear array during said single scan do not overlap.

2. The method of claim 1 wherein said first color ink, said second color ink, and said third color ink are cyan ink, magenta ink, and yellow ink, respectively.

3. The method of claim 1 where each color ink is associated with a pair of linear arrays of nozzles positioned side by side, such that said tricolor pen contains at least three pairs of said linear arrays.

4. The method of claim 1 further comprising selectively energizing said ink ejection elements for ejecting ink from associated nozzles in said first linear array, said second linear array, and said third linear array during a second scan, subsequent to said single scan, such that different color inks which are ejected from said linear arrays during said second scan do not overlap during said second scan, said different color inks that are ejected during said second scan overlapping said different color inks that were ejected during said single scan.

5. The method of claim 4 further comprising selectively energizing said ink ejection elements for ejecting ink from associated nozzles in said first linear array, said second linear array, and said third linear array during a third scan, subsequent to said second scan, such that different color inks which are ejected from said linear arrays during said third scan do not overlap during said third scan, said different color inks that are ejected during said third scan overlapping said different color inks that were ejected during said single scan and said second scan.

6. The method of claim 5 wherein said step of selectively energizing said ink ejection elements for said single scan, said second scan, and said third scan comprises selectively energizing only a predetermined subset of ink ejection elements for each scan associated with nozzles in said first linear array, said second linear array, and said third linear array.

7. The method of claim 6 wherein said predetermined subset of ink ejection element for said single scan is a first group of ink ejection elements, wherein said predetermined subset of ink ejection elements for said second scan is a second group of ink ejection elements, and said predetermined subset of ink ejection elements for said third scan is a third group of ink ejection elements.

8. The method of claim 7 wherein said ink ejection elements from said first group only eject ink of said first color, said ink ejection elements from said second group only eject ink of said second color, and said ink ejection elements from said third group only eject ink of said third color.

9. A color printer comprising:

an inkjet tricolor pen, said tricolor pen containing at least three linear arrays of nozzles, each nozzle having an associated ink ejection element for ejecting ink through an associated nozzle, a first linear array of nozzles for ejecting a first color ink, a second linear array of nozzles for ejecting a second color ink, and a third linear array of nozzles for ejecting a third color ink;

a scanning carriage supporting said tricolor pen which scans in a horizontal direction, said linear arrays of nozzles running parallel to each other and each linear array running in a vertical direction such that said first linear array, said second linear array, and said third linear array scan across a same area of a medium to be printed upon during a single scan of said scanning carriage; and a print controller for selectively energizing ink ejection elements in said tricolor pen for ejecting ink through associated nozzles in said first linear array, said second linear array, and said third linear array during a single scan so that different color inks that are ejected from said first linear array, said second linear array, and said third linear array during said single scan do not overlap.

10. The printer of claim 9 wherein said first color ink, said second color ink, and said third color ink are cyan ink, magenta ink, and yellow ink, respectively.

11. The printer of claim 9 where each color ink is associated with two linear arrays of nozzles positioned said by side, such that said tricolor pen contains at least three pairs of said linear arrays.

12. The printer of claim 9 wherein said controller also selectively energizes said ink ejection elements for ejecting ink from associated nozzles in said first linear array, said second linear array, and said third linear array during a second scan, subsequent to said single scan, such that different color inks which are ejected from said linear arrays during said second scan do not overlap during said second scan, said different color inks that are ejected during said second scan overlapping said different color inks that were ejected during said single scan.

13. The printer of claim 12 wherein said controller also selectively energizes said ink ejection elements for ejecting ink from associated nozzles in said first linear array, said second linear array, and said third linear array during a third scan, subsequent to said second scan, such that different color inks which are ejected from said linear arrays during said third scan do not overlap during said third scan, said different color inks that are ejected during said third scan overlapping said different color inks that were ejected during said single scan and said second scan.

14. The printer of claim 13 wherein said controller selectively energizes said ink ejection elements for said single scan, said second scan, and said third scan comprises selectively energizing ink ejection elements for each scan associated with nozzles in said first linear array, said second linear array, and said third linear array.

15. The printer of claim 14 wherein said predetermined subset of ink ejection element for said single scan is a first group of ink ejection elements, wherein said predetermined subset of ink ejection elements for said second scan is a second group of ink ejection elements, and said predetermined subset of ink ejection elements for said third scan is a third group of ink ejection elements.

16. A method of controlling a plurality of substantially similar linearly aligned printheads for the depositing of different color inks onto a medium, each individual printhead being configured with a linear nozzle array for ejecting ink onto the medium, and each printhead being substantially aligned in a common scanning plane with all of the other printheads, comprising:

maintaining the medium in a stationary position below the common scanning plane of the printheads;

passing the plurality of printheads in unison over the stationary medium at least once to facilitate the formation of a swath;

simultaneously depositing a plurality of different color inks onto the stationary medium from the plurality of printheads, each individual printhead ejecting a different color ink from the ink ejected by the other individual printheads; and wherein said step of depositing includes:

energizing selectively individual ones of the plurality of printheads so that ink is ejected substantially simultaneously from different nozzle array areas without any substantial overlapping between the individual areas during each individual pass.

17. A method of controlling a plurality of substantially similar linearly aligned printheads for the depositing of different color inks onto a medium, each individual printhead being configured with a linear nozzle array for ejecting ink onto the medium, and each printhead being substantially aligned in a common scanning plane with all of the other printheads, comprising:

maintaining the medium in a stationary position below the common scanning plane of the printheads;

passing the plurality of printheads in unison over the stationary medium at least twice to facilitate the formation of a swath;

simultaneously depositing a plurality of different color inks onto the stationary medium from the plurality of printheads during each individual pass, each individual printhead during each individual pass ejecting a different color ink from the ink ejected by the other individual printheads; and wherein said step of depositing includes:

energizing selectively individual ones of the plurality of printheads so that ink is ejected from different ones of the nozzle arrays relative to one another without any substantial overlapping during each individual pass.

18. A method of forming a color image, comprising the steps of:

scanning a common area on a print medium with a carriage unit holding a plurality of printheads, each individual one of the printheads including a plurality of nozzle arrays; and ejecting different color inks from selective portions of individual ones of said plurality of nozzle arrays to substantially prevent overlapping ink swaths of different color inks during said step of scanning.

19. A method of forming a color image according to claim 18, further comprising:

determining a sufficient number of scanning and ejecting steps based upon a required number of different color inks to be in the color image formed on the print medium.

20. A method of forming a color image according to claim 18, further comprising:

moving the print medium orthogonally to the direction travelled by said carriage unit a predetermined distance; and repeating said steps of scanning, ejecting and moving until the color image is formed on said print medium.

21. A method of forming a color image according to claim 20, wherein said step of ejecting includes:

ejecting different color inks from other selective ones of said plurality of printheads between an inter-scan to provide overlapping ink swaths for facilitating the formation of the color image on said print medium.

22. A printer for forming a color image on a print medium, comprising:

a movable carriage unit configured to hold a plurality of printheads to facilitate the scanning of a common area on a print medium, each individual one of an printheads including a plurality of nozzle arrays; and a processor for controlling the ejecting of different color inks from selective portions of each individual one of said plurality of nozzle arrays without overlapping ink swaths of different color inks during the scanning of said common area on the print medium.

23. A printer according to claim 22, wherein each individual one of said plurality of printheads includes:

a plurality of linear nozzle arrays with associated ink ejection elements, said plurality of nozzle arrays being aligned to provide simultaneous ink coverage on said common area as said carriage unit travels along a scanning path above said common area on the print medium during a single scanning pass.

24. A printer according to claim 23, wherein said processor includes:

control means for moving the print medium a predetermined distance orthogonally to the direction travelled by said carriage unit.

25. A printer according to claim 22, wherein said processor further controls the ejecting of different color inks from other selective ones of said plurality of nozzle arrays between inter-scans to provide overlapping ink swaths that facilitating the formation of the color image on the print medium.

* * * * *

UNITED STATES PATENT AND TRADEMARK OFFICE
CERTIFICATE OF CORRECTION

PATENT NO. : 5,903,290
DATED : May 11, 1999
INVENTOR(S) : Nicoloff, Jr., et. al.

It is certified that error appears in the above-identified patent and that said Letters Patent is hereby corrected as shown below:

At Column 8, line 31, after "positioned", delete "said" and insert thereof --side--.

Signed and Sealed this

Twenty-first Day of September, 1999

Attest:

Q. TODD DICKINSON

*Attesting Officer*   *Acting Commissioner of Patents and Trademarks*